(12) United States Patent
Holopainen

(10) Patent No.: US 8,164,227 B2
(45) Date of Patent: Apr. 24, 2012

(54) END SHIELD

(75) Inventor: Timo Holopainen, Espoo (FI)

(73) Assignee: ABB OY, Helsinki (FI)

( * ) Notice: Subject to any disclaimer, the term of this patent is extended or adjusted under 35 U.S.C. 154(b) by 152 days.

(21) Appl. No.: 12/159,441

(22) PCT Filed: Jan. 4, 2007

(86) PCT No.: PCT/FI2007/000004
§ 371 (c)(1),
(2), (4) Date: Jun. 27, 2008

(87) PCT Pub. No.: WO2007/077303
PCT Pub. Date: Jul. 12, 2007

(65) Prior Publication Data
US 2008/0290749 A1    Nov. 27, 2008

(30) Foreign Application Priority Data
Jan. 5, 2006    (FI) .................................... 20060012

(51) Int. Cl.
*H02K 5/15* (2006.01)
(52) U.S. Cl. .......................................... 310/89; 310/401
(58) Field of Classification Search .......... 310/400–417, 310/58, 59, 62, 63, 64
See application file for complete search history.

(56) References Cited

U.S. PATENT DOCUMENTS

| | | | |
|---|---|---|---|
| 2,795,713 A * | 6/1957 | Woll et al. | 310/402 |
| 3,226,580 A * | 12/1965 | Oehlrich et al. | 310/57 |
| 3,313,968 A | 4/1967 | Kaiser | |
| 3,521,096 A * | 7/1970 | Merriam | 310/154.13 |
| 3,732,616 A | 5/1973 | Masrrodonato et al. | |
| 3,889,141 A * | 6/1975 | Merriam | 310/154.24 |
| 3,900,749 A * | 8/1975 | Carriker | 310/156.43 |
| 4,167,683 A * | 9/1979 | Hallerback et al. | 310/63 |
| 4,186,319 A | 1/1980 | Dochterman | |
| 4,631,433 A * | 12/1986 | Stokes | 310/89 |
| 5,185,544 A * | 2/1993 | Takada | 310/58 |
| 5,412,270 A | 5/1995 | Butcher et al. | |
| 5,497,039 A | 3/1996 | Blaettner et al. | |

(Continued)

FOREIGN PATENT DOCUMENTS

CN    2265023 Y    10/1997

(Continued)

OTHER PUBLICATIONS

Form PCT/ISA/210 (International Search Report) dated Apr. 25, 2007.
Form PCT/ISA/237 (Written Opinion of the International Searching Authority) dated Apr. 25, 2007.

(Continued)

*Primary Examiner* — Quyen Leung
*Assistant Examiner* — Eric Johnson
(74) *Attorney, Agent, or Firm* — Buchanan Ingersoll & Rooney PC

(57) ABSTRACT

A cast end shield for an electrical machine, said end shield supporting a bearing that supports the rotor, and said end shield having an opening in the middle. In the radial direction from the centre of the shield, there is an inner rim limited by the opening, an intermediate rim connected to the inner rim and an outer rim connected to the intermediate rim. The intermediate rim has at least one substantially waved reinforcement structure, and within the reinforcement structure, the valleys of the waves are substantially in the radial direction.

15 Claims, 10 Drawing Sheets

U.S. PATENT DOCUMENTS

| | | | | |
|---|---|---|---|---|
| 5,852,338 A | * | 12/1998 | Boyd et al. .................... | 310/89 |
| 5,949,163 A | | 9/1999 | Karafillis et al. | |
| 2008/0093937 A1 | * | 4/2008 | Winkler et al. ................ | 310/42 |

FOREIGN PATENT DOCUMENTS

| | | |
|---|---|---|
| DE | 29 51 859 B1 | 3/1981 |
| EP | 1 014 537 A2 | 6/2000 |
| FR | 2 872 352 A1 | 12/2005 |
| WO | 2006/032587 A1 | 3/2006 |

OTHER PUBLICATIONS

Form PCT/IPEA//409 (International Preliminary Report on Patentability) dated Mar. 17, 2008.

Non-English version of Finnish Search Report (with English language translation of category of cited documents) dated Jun. 19, 2006.

English translation of Second Office Action issued on Dec. 6, 2010 in a corresponding Chinese application (now Chinese Patent ZL200780001878.5).

* cited by examiner

END SHIELD

An end shield is a standard structure in many electrical machines. The end shield closes the opening at the end of the frame of an electrical machine through which the stator is installed into the frame. The end shield also serves as the attachment base for bearings supporting the rotor. It transfers the rotor's supporting forces to the frame of the electrical machine.

The end shield's purpose of protecting the electrical and rotating parts of the electrical machine and serving as a structure supporting the bearing imposes several functional requirements on it. The most important functional requirements include stiffness of the end shield and small axial space requirement. Furthermore, the end shield should be competitive in terms of manufacturing costs.

The most important purpose of the end shield is to support the bearing, which in turn supports the rotor. Stiff support of the rotor enables increased critical rotational speeds and reduces the vibration levels of the bearings. Stiff support of the rotor can be achieved through radially stiff rotor support. The stiffness of radial support is affected by the radial and rotational stiffness of the end shield. The latter refers to the shield's ability to receive the bending moment, represented by a vector in the same plane as the shield and transmitted by the bearing, without substantial rotation.

The axial stiffness of the end shield is particularly important in vertical machines in which the entire mass of the rotor is transferred to the frame of the electrical machine through the end shield. The axial stiffness of the end shield also crucially affects the natural frequency of axial mode of the frame end. The frequency, in turn, is closely related to the vibration levels of the bearings.

Small axial space requirement is advantageous for the end shield. The objective is to achieve the shortest possible bearing span in relation to the axial space reserved for the active components (stator, windings, stator connection and air insulation). The space requirement of the end shield can be measured by the distance between the axial plane surface touching the air insulation space and the axial middle plane of the bearing. The plane surface touching the air insulation space is determined to be in the location where the air insulation space is completely on the stator side. The axial middle plane of the bearing is usually the symmetry plane of the rolling or sliding elements. The space requirement of the end shield is particularly important for two-pole stiff shaft electrical machines in which all of the critical rotational speeds must be kept above the operating rotational speed.

The end shields of large electrical machines have traditionally been manufactured from thick steel sheet by machining. A substantial advantage of a machined steel shield is its economic efficiency as the most important factor affecting the price is the thickness of the steel shield. However, the bending stiffness of steel sheet of a uniform thickness is poor in relation to weight. Furthermore, the local stiffness of the bearing attachment is determined by the thickness of the end shield. Thus, general bending stiffness and the local stiffness of the attachment can be improved mainly by increasing the thickness of the end shield. On the other hand, increasing the thickness of the end shield increases the material costs as well as the axial space requirement of the end shield within the electrical machine.

The bending stiffness of a steel shield can also be clearly increased by reinforcements, for example by welding external reinforcements onto the shield. This introduces new stages of end shield manufacture and creates more costs. Furthermore, in the placement of the reinforcements, the functional requirements for the end shield, as well as factors affecting its appearance must be considered.

A purpose of the present invention is to create a cast end shield for an electrical machine that is used to support a bearing.

A cast end shield for an electrical machine according to the invention supports the bearing that supports the rotor. The end shield has an opening in the middle, an inner rim extending radially from the centre of the shield and limited by the opening, an intermediate rim connected to the inner rim and an outer rim connected to the intermediate rim. The intermediate rim has at least one substantially waved reinforcement structure in which the valleys of the waves are substantially in the radial direction.

The waved reinforcement structure on the intermediate rim provides high global bending stiffness for the end shield. The waved reinforcement structure is formed of alternate ridges and valleys. Both sides of the waved reinforcement structure, the front as well as the back, are waved. Within the reinforcement structure on the intermediate rim, radial structures alternate on both sides of the neutral surface, and the structures are primarily continuous. The waved reinforcement is stiff in relation to its weight because a substantial part of the material, the ridges and valleys, are far away from the so-called neutral surface of bending. In a structure that is strong in terms of stiffness, the planes on the surface, the ridges and the valleys, are thick, and the vertical walls are relatively thin and as vertical as possible. The thickness of the walls in the reinforcement structure and/or the height of the profile are changed in the radial direction as necessary in order to achieve the bending stiffness that is most advantageous for the intermediate rim in each case.

It is advantageous in terms of bending stiffness that within the waved reinforcement structure on the intermediate rim, the valleys of the waves are located at equal intervals and that the valleys and ridges of the waves are equal in width. An advantageous interval between the valleys of the waves is $90°>L>15°$. Too long distances between the valleys—that is, too coarse spacing—prevents the ridges and valleys from operating efficiently due to factors such as shear lag. On the other hand, a small interval will unnecessarily increase the weight of the end shield due to vertical intervals that have an ineffective stiffness/mass ratio. Even though the end shield is not symmetrical in relation to its horizontal axis, angular intervals that are even divisors of 90°, such as 45° and 30°, are advantageous.

In cases in which the bearing or the shield support strongly deviates from rotationally symmetrical structure, it is advantageous to deviate from equal spacing. Local deviations from the waved shape can also be made to create space for the oil sump of journal bearings, oil tubes, sensors or their installation.

The inner and outer rims of the end shield provide stiff support for the intermediate rim. Bending load coming from the intermediate rim is transferred to torsional load on the inner and outer rims. According to a preferred embodiment, the axial thickness of the inner and outer rims is at least equal to the thickness of the intermediate rim at the corresponding point of contact. In another preferred embodiment, the radial height of the inner and outer rims is sufficient to receive variation in the axial force coming from the intermediate rim without any substantial local deformation. In a further preferred embodiment, the cross-sectional area of the inner and outer rims is sufficiently large to provide sufficient torsional stiffness of the rims in relation to the bending stiffness of the intermediate rim. The required area of the inner and outer rims is linked to the cross-sectional shape of the rim that affects the torsional stiffness.

The cast structure of the end shield enables balanced implementation of the requirements set for the inner, intermediate and outer rims in a cost-efficient manner. For example, in shield solutions made by compression/forming of thin sheet metal, the sheet thickness generally remains the same, and it is difficult to achieve the stiffness required of the inner and outer rims, for example. A cast structure results in substantial savings in material and machining costs compared to an end shield of similar stiffness machined from a uniform-thickness steel plate. Furthermore, substantial savings in assembly costs are created in comparison to assembling a structure of similar stiffness by welding components together.

The stiffness of the end shield can also be improved by means of a projection formed on the inner rim of the end shield facing the electrical machine, such as a reinforcement ring. In this case the inner rim of the end shield protrudes towards the electrical machine. A reinforcement ring on the inner rim increases the stiffness of the inner rim and therefore has an improving effect on the global bending stiffness as well as the local stiffness of the bearing attachment. It also reduces unwanted local deformations of the end shield that may be caused in connection with a centre-flange journal bearing, for example. By extending the inner surface of the end shield at the winding ends of the electrical machine, to reach the limiting surface determined by the winding ends and the air insulation gap, the bending stiffness is improved in a way that is efficient in terms of the use of material. Extension of the reinforcement ring towards the internals of the electrical machine is particularly advantageous in connection with journal bearings.

In addition to reinforcing the outer rim, a reinforcement ring formed on the outer rim can be used to reinforce the joint between the end shield and the frame of the electrical machine as necessary. It is advantageous to use a reinforcement ring to improve the stiffness of the end shield if the side of the joint facing the frame of the electrical machine is flexible. Placement of the reinforcement ring on the end shield on the side opposite to the electrical machine provides several alternatives for choosing the position of the mating surface between the end shield and the frame of the electrical machine, and reduces the space requirement of the end shield on the side of the electrical machine.

If openings need to be made in the end shield, it is advantageous to minimise their size and number in order not to hamper the stiffness properties of the shield. The openings cause the least disadvantage if they are implemented close to the neutral surface of the shield. In particular, it is advantageous to keep the tangential width of openings located far away from the neutral surface of the intermediate rim as small as possible.

The end shield according to the invention is lightweight compared to its stiffness. The relation between the weight and stiffness of the end shield can be optimised by varying the material thickness of the waved reinforcement structure and by choosing different profile heights in the radial direction. Furthermore, it is advantageous to optimise the inner and outer rims as part of the overall complex. The light weight of the end shield results in low material costs.

In an embodiment of the invention, the axial space requirement of the end shield has been reduced by moving the bearing toward the internals of the electrical machine. Such embedding particularly reduces the bearing span of the electrical machine in relation to the axial space available for the active parts. Furthermore, embedding can reduce the bending moments imposed on the shield caused by the radial forces transferred from the rotor, which are caused by the axial distance between the neutral plane representing the neutral surface of the end shield and the middle surface of the bearing. In this respect, embedding is particularly advantageous in connection with journal bearings as the axial middle plane of journal bearings deviates from the bearing attachment surface. If a short bearing span is a crucial objective, as is the case in connection with "stiff-shaft" machines, for example, the middle plane of the bearing can be placed on the side of the motor in relation to the neutral plane of the shield. Embedding the bearing into the shield is particularly advantageous for journal bearings with forced-feed lubrication, as lubrication ensures the transfer of heat from the bearings. Embedding also results in advantages in connection with other journal and rolling bearings. An optimal solution must take into account at least the heat transfer requirements, as well as the advantages and disadvantages caused by changing the bearing span.

The end shield is suitable for use in many different electrical machines and electrical machine solutions. A stiff and lightweight shield has particular advantages in certain types of machines, such as: vertically installed electrical machines in which the shaft line is vertical and the end shield bears the entire mass of the rotor in the axial direction; two-pole machines in which axial resonances of the motor end have to be controlled; stiff-shaft machines in which the critical rotational speed must be kept above the operating speed; variable-speed drives in which the axial frequencies of the motor end have to be kept outside substantial excitation frequency ranges; wind generators in which shield vibrations at the bearing bypass frequency are being controlled.

In the following the invention will be described in more detail with the help of certain embodiments by referring to the enclosed drawings, where FIGS. 1 a) and 1 b) illustrate a waved reinforcement structure;

Figure 4:
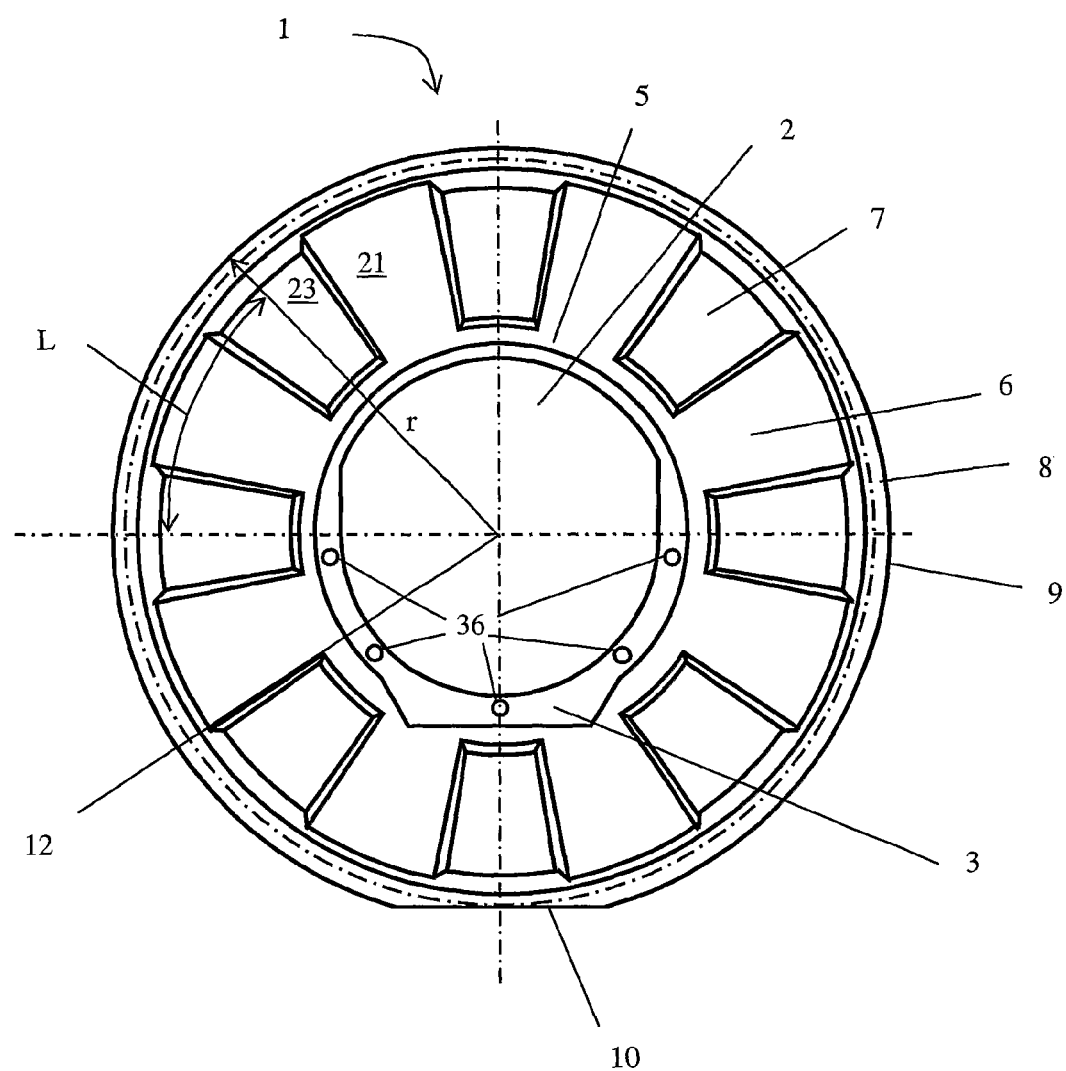
Figure 4:
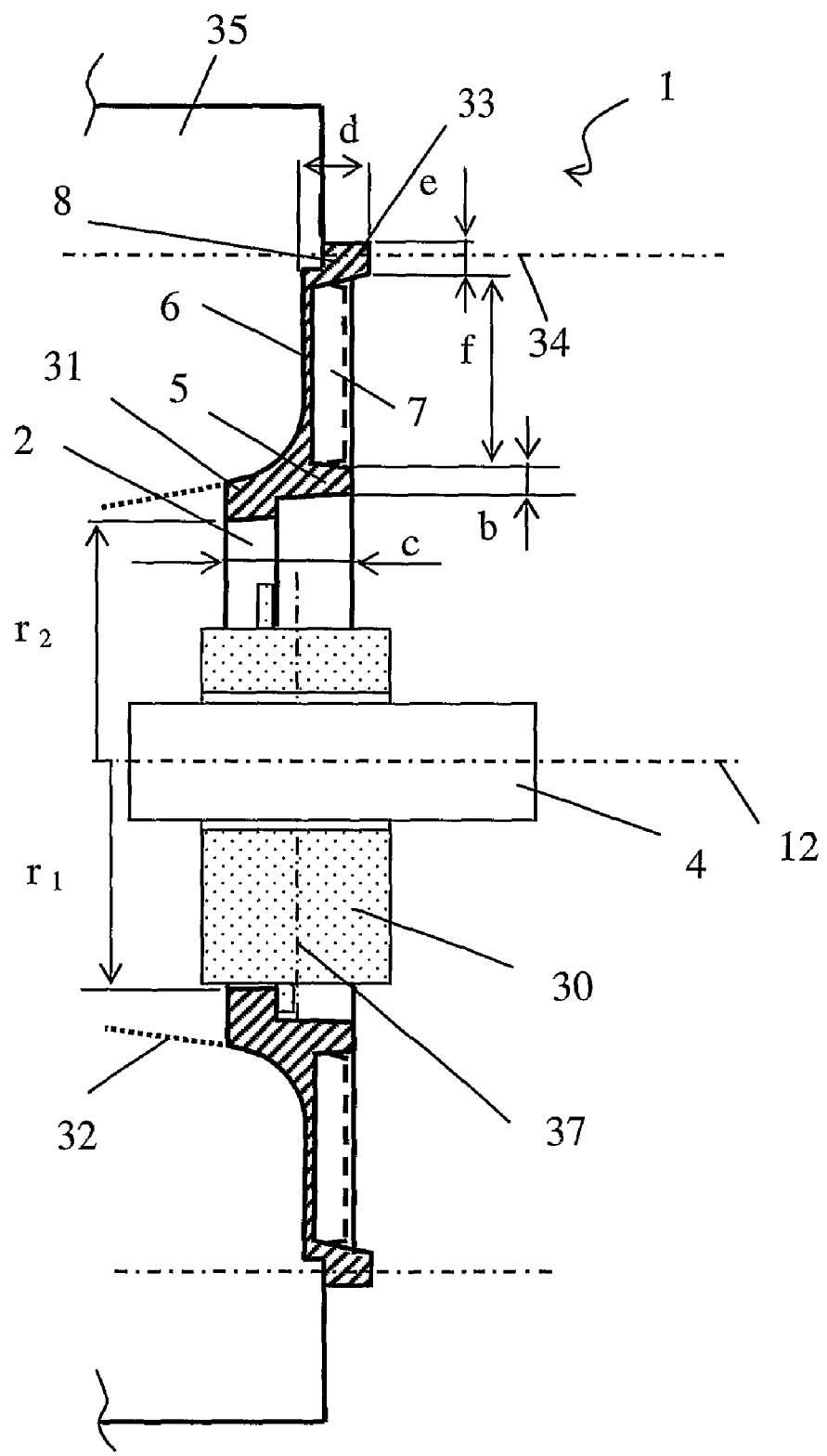
Figure 5:
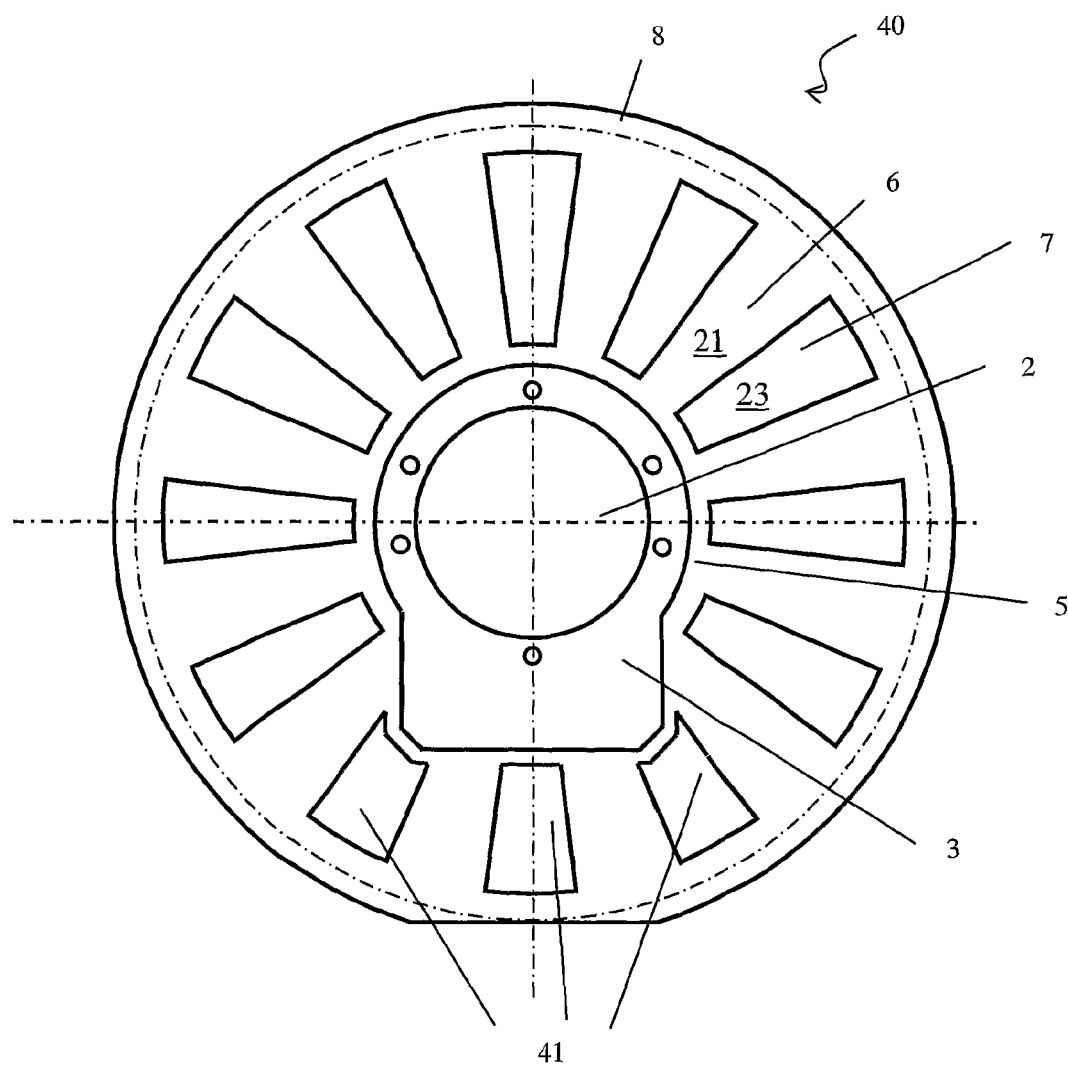
Figure 5:
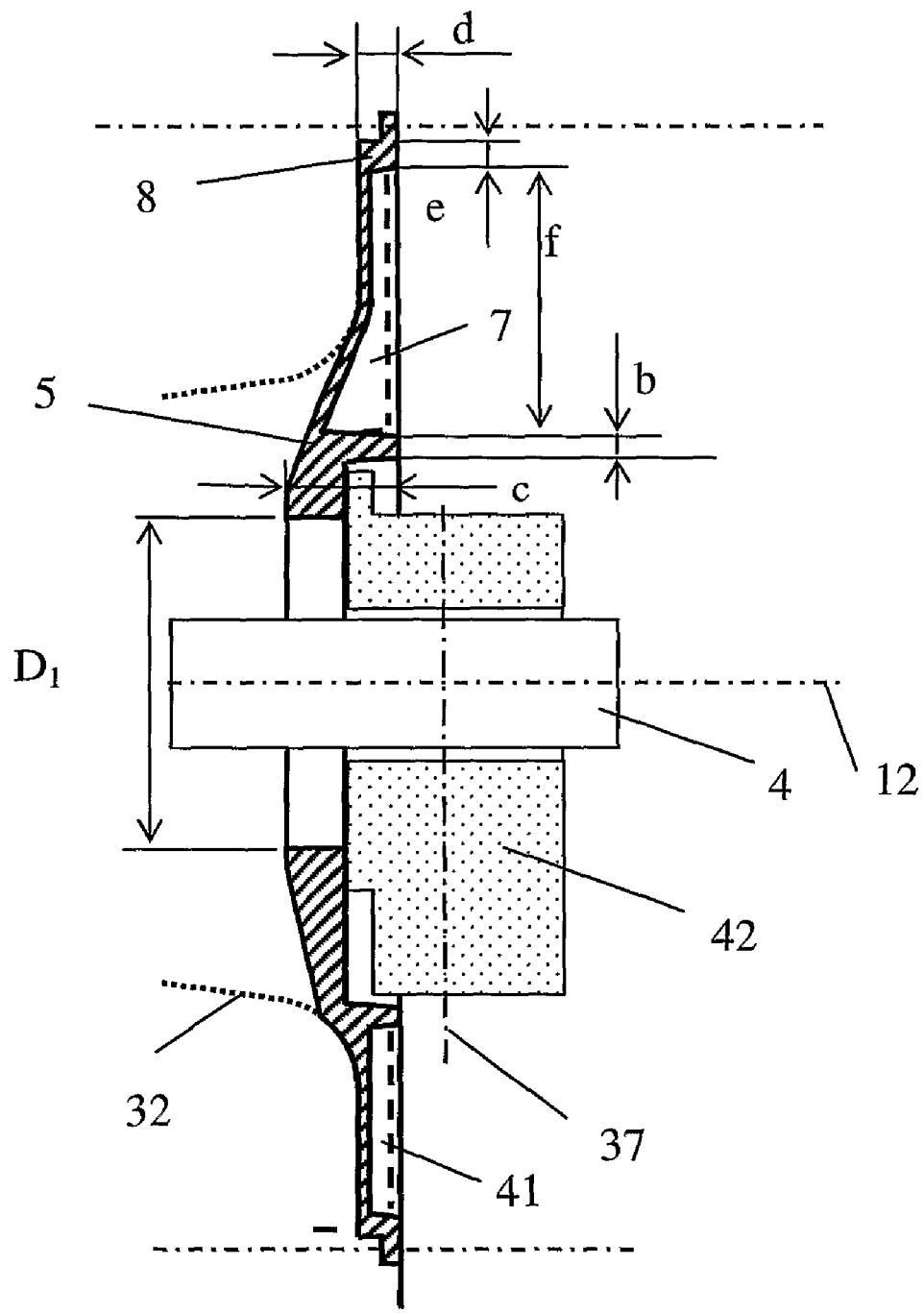
Figure 6:
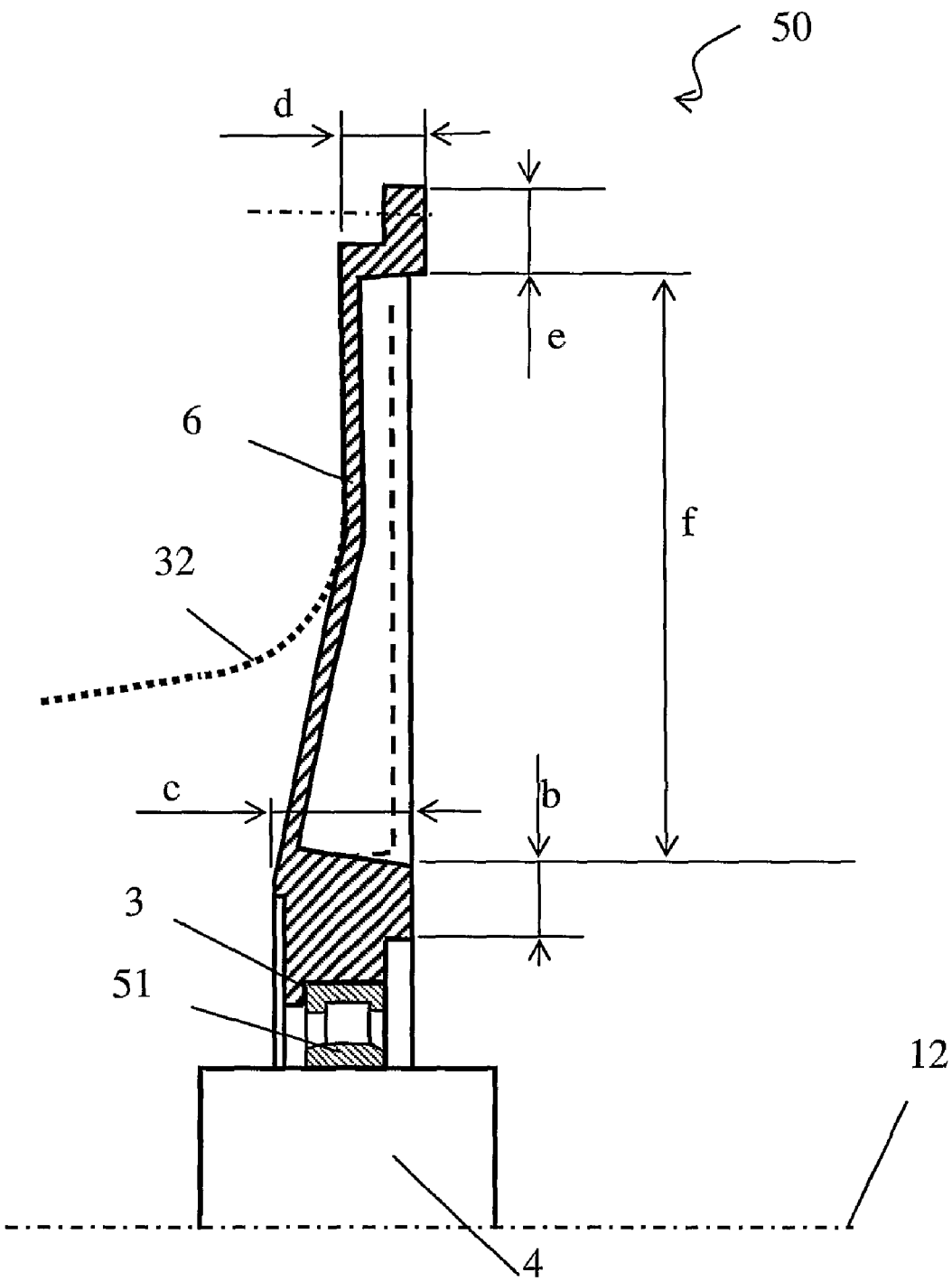
Figure 7:
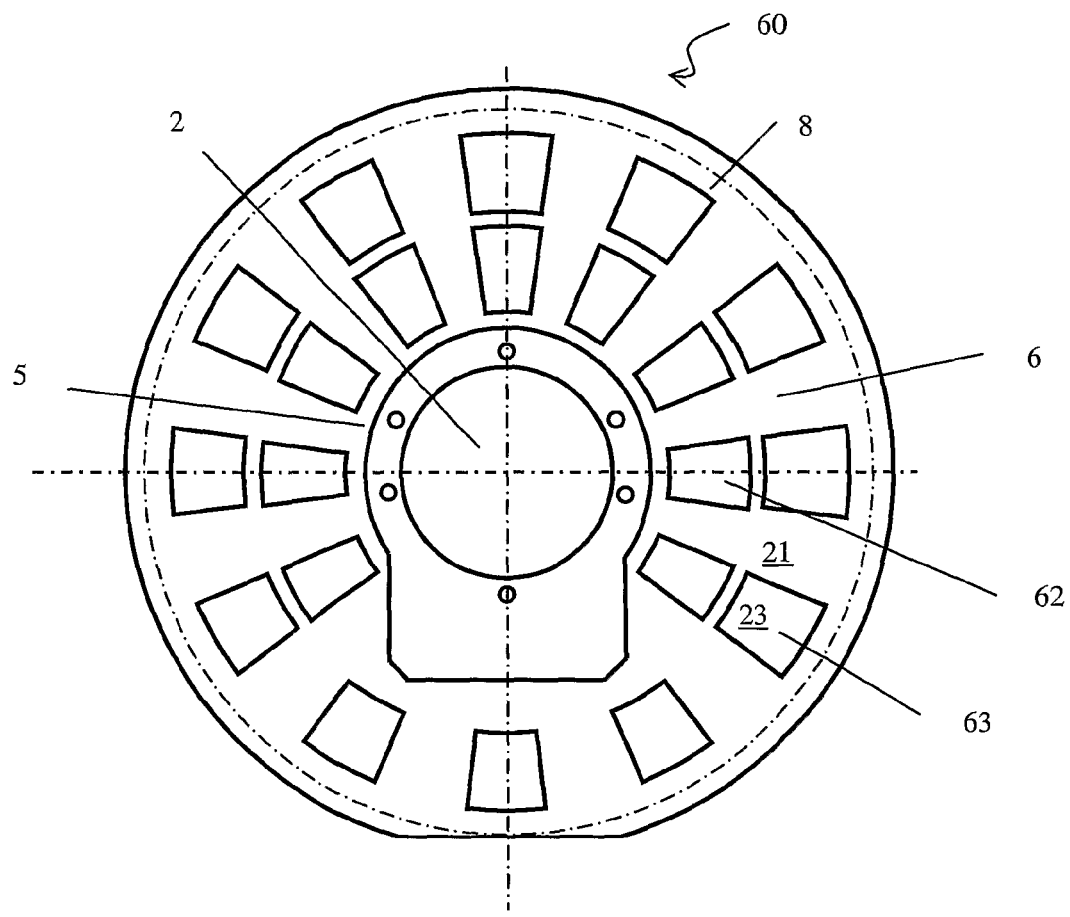
Figure 7:
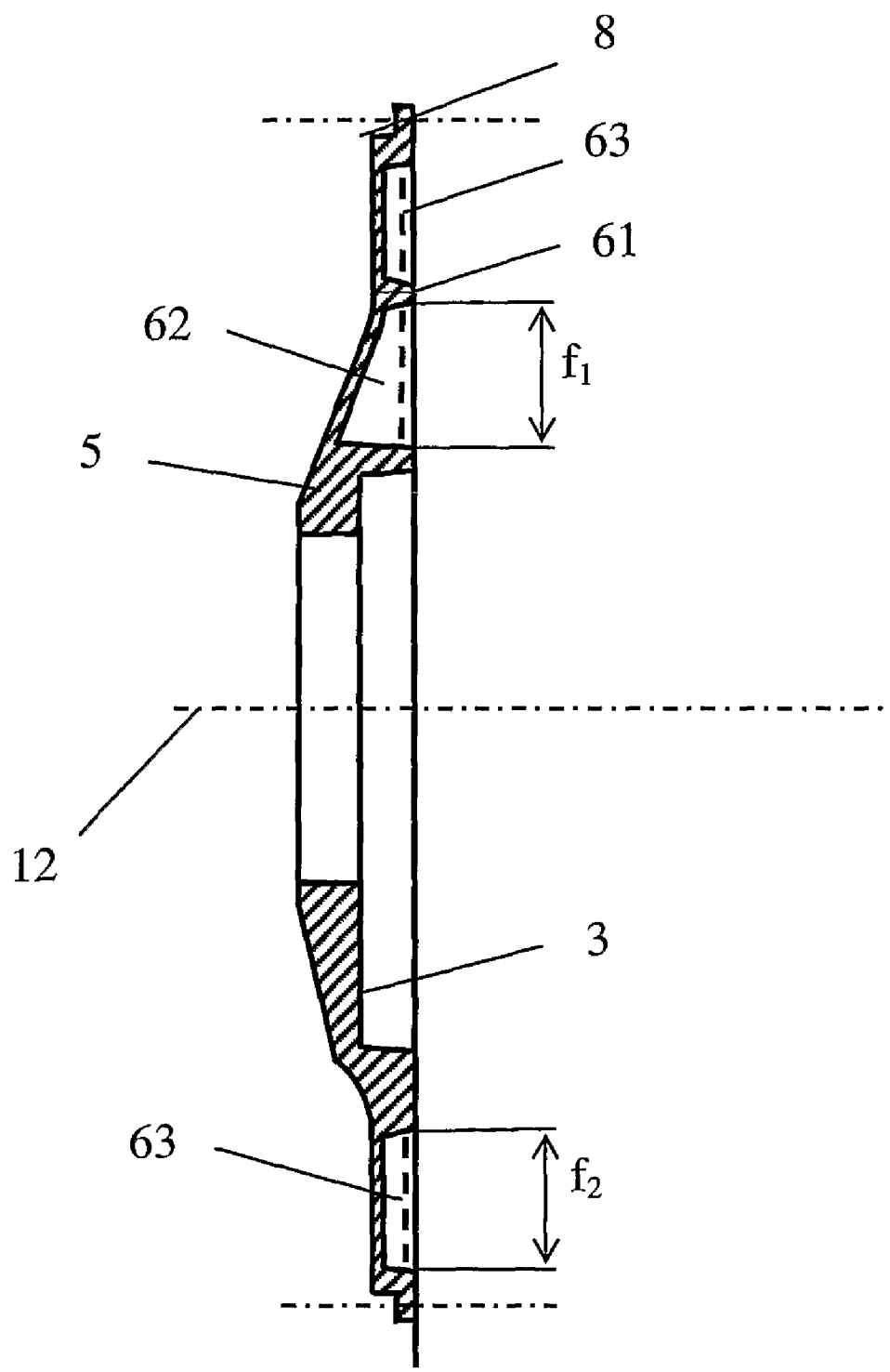

FIGS. 4 a) and 4 b) illustrate an end shield and its cross-section for a centre-flange journal bearing;

FIGS. 5 a) and 5 b) illustrate an end shield and its cross-section for a side-flange journal bearing;

FIG. 6 illustrates the cross-section of an end shield for a rolling bearing;

FIGS. 7 a) and 7 b) illustrate an end shield in which the waved reinforcement structure has two parts and the shield is adapted for a side-flange journal bearing.

Figure 1:
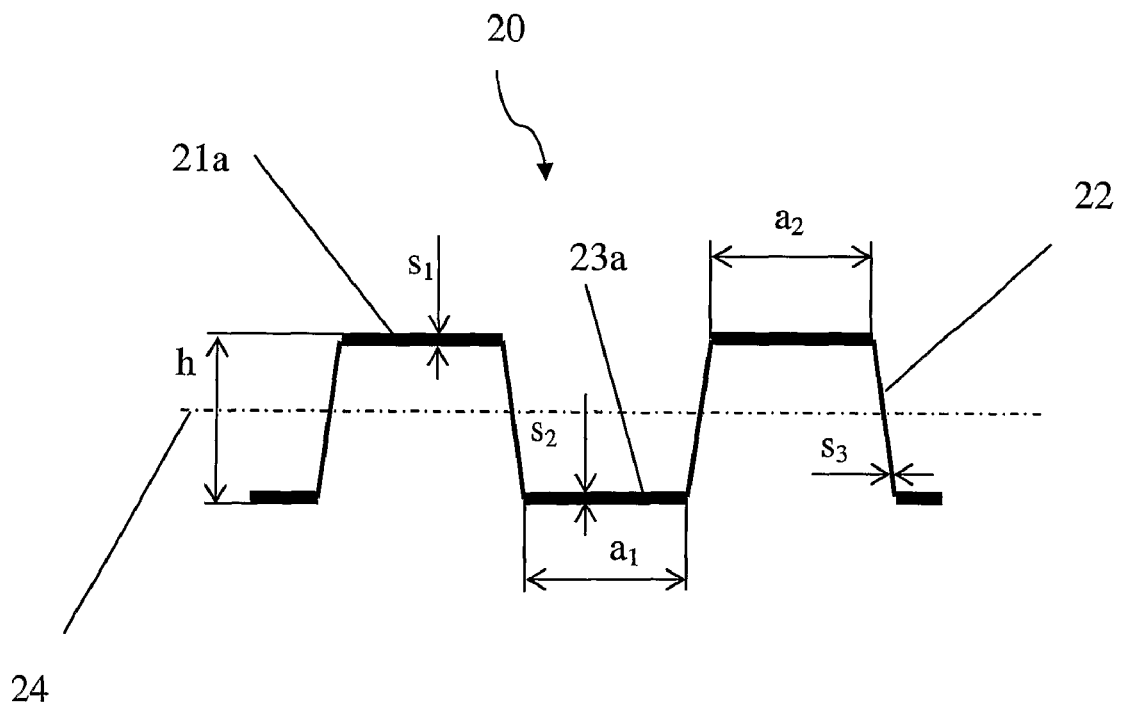
Figure 1:
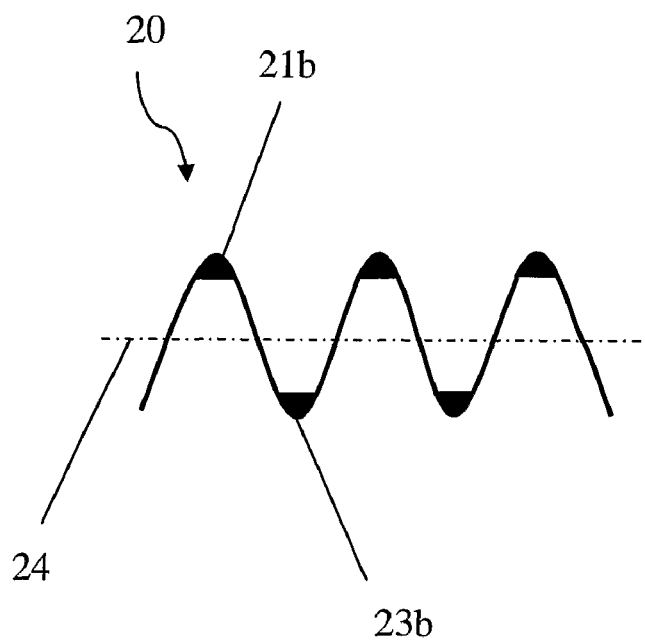

FIGS. 1 a) and 1 b) illustrate a waved reinforcement structure. The waved reinforcement structure 20 is formed of alternate ridges 21a, 21b and valleys 23a, 23b. The profile height h of the reinforcement structure is the vertical distance between the bottom surface of the valley 23a and the top surface of the ridge 21a. The waved reinforcement is stiff in relation to its weight because a substantial part of the material, the ridges 21a, 21b and the valleys 23a, 23b, are far away from the neutral surface 24. In a structure that is advantageous in terms of the stiffness/weight ratio, the planes on the surface, the ridges 21a and the valleys 23a, are thick $s_1$, $s_2$ and equally wide $a_1$, $a_2$, and the vertical walls 22 are relatively thin $s_3$ and as vertical as possible in the axial direction. In FIG. 1 a), the planar sections of the waved reinforcement structure, the ridges 21a and valleys 23a, alternate on both sides of the neutral surface 24. In FIG. 1 b), the peaks of the waves in the waved reinforcement structure, the ridges 21b and valleys

23b, alternate on both sides of the neutral surface 24. An advantageous interval between the valleys of the waves is 90°>L>15°.

Figure 2:
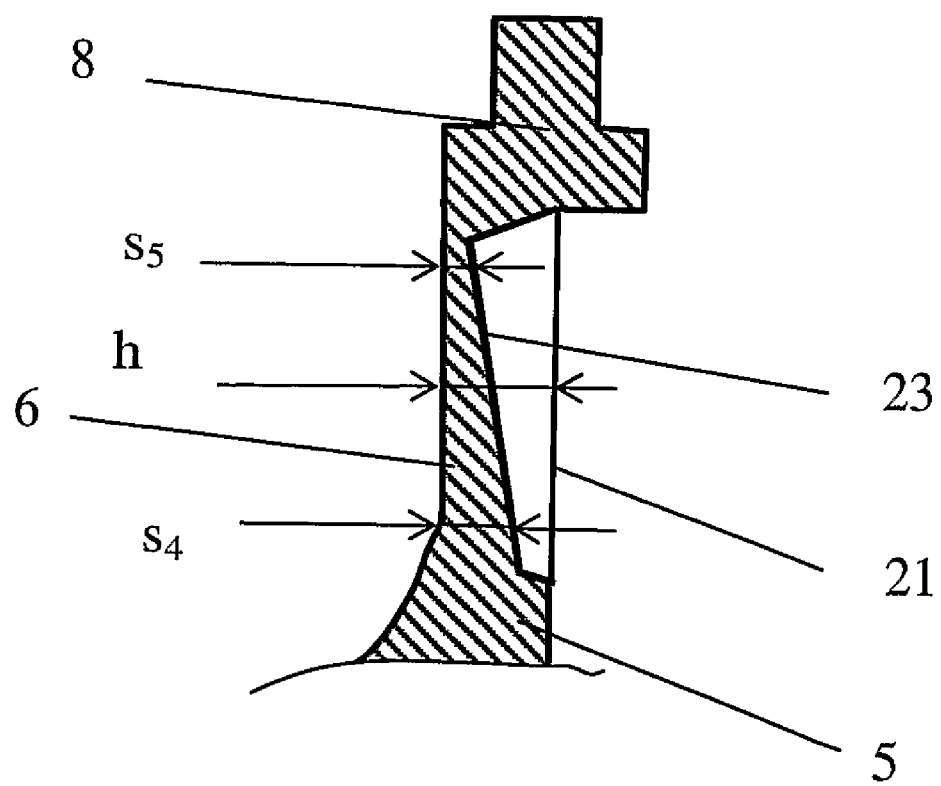
FIG. 2 illustrates a cross-section of a waved reinforcement structure in an end shield.
Figure 3:
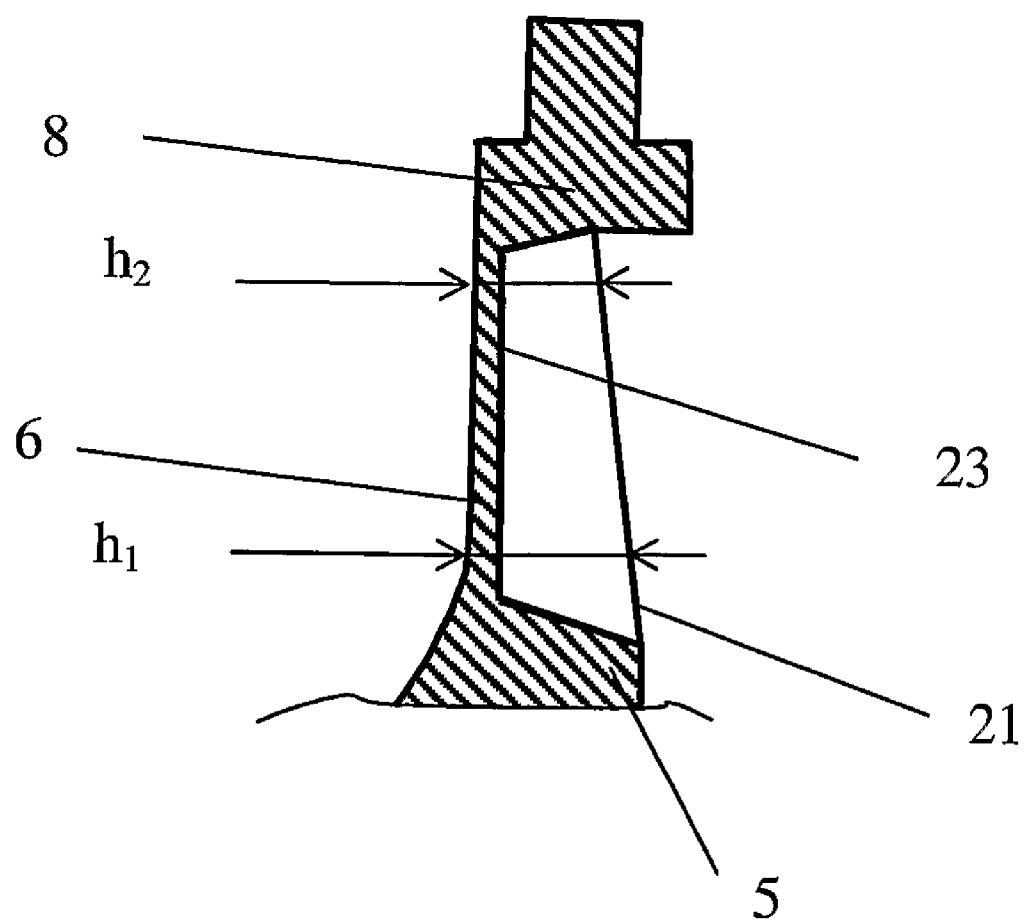
FIG. 3 illustrates a cross-section of another waved reinforcement structure in an end shield.

FIGS. 2 and 3 illustrate the cross-section of the waved reinforcement structure on the intermediate rim 6 in the end shield. In FIG. 2, the wall thickness of the reinforcement structure has been modified in the radial direction so that the wall thickness $s_5$ close to the outer rim 8 is less than the wall thickness $s_4$ close to the inner rim 5.

In FIG. 3, the profile height h of the reinforcement structure on the intermediate rim 6 has been modified in the radial direction so that the profile height $h_2$ close to the outer rim 8 is less than the profile height $h_1$ close to the inner rim 5. This makes the stiffness of the intermediate rim increase towards the inner rim.

FIGS. 4 a) and b) illustrate the basic structure of a cast end shield for a centre-flange journal bearing. There is an opening 2 for the rotor shaft in the middle of the end shield 1. The opening 2 is partially circular. The opening 2 can be divided into an upper part and a lower part by a line that is horizontal against the axial line 12 of the rotor. The lower part of the opening 2 is semicircular. The radial distance from the axial line 12 of the rotor to the bottom edge $r_1$ of the opening 2 is less than the distance to the top edge $r_2$ of the opening 2. With a centre-flange journal bearing, the bearing is attached to the end shield only by the lower half, which is attached by bolt mounting 36 onto an attachment surface 3 at the lower part of the opening 2. The surface 3 in the lower part of the opening 2 is larger than that in the upper part due to the space required for the bolt mounting 36 and the oil sump of the embedded journal bearing. Further space shall be reserved in the opening 2 for installation, which makes the upper half of the opening 2 oval. The opening 2 is symmetrical in relation to the vertical axis against the axial line 12 of the rotor.

In the radial direction r from the centre of the shield at the axial line 12 of the rotor, the end shield is divided into an inner rim 5 limited by the opening 2, an intermediate rim 6 and an outer rim 8. The inner rim 5 is limited by the intermediate rim 6, and the intermediate rim 6 is limited by the outer rim 8, so that the rims form a uniform piece. There is a waved reinforcement structure on the intermediate rim 6 consisting of alternate ridges 21 and valleys 23. The structure is formed over the entire length of the intermediate rim 6. The valleys 23 and the ridges 21 are substantially radially continuous; in other words, no holes or openings have been made into the valleys or ridges for the conveyance of cooling air, for example. Substantial holes or openings in the valleys 23 or the ridges 21 reduce the effectiveness of the end shield by reducing its stiffness. It is advantageous that any local deviations used to create space for the oil sump of journal bearings, oil tubes, sensors or their installation shall be kept small.

Within the reinforcement structure, the recesses 7 extend from the inner rim 5 to the outer rim 8, which is efficient in terms of bending stiffness. The intermediate rim 6 is a ring formed of the recesses 7 with a constant radial height f. The valleys 23 of the recesses 7 are in the radial direction r. The recesses 7 are located at equal intervals. Equal spacing of the recesses is the best alternative in terms of bending stiffness. The circumferential interval L of the recesses 7 is 45°. The outer edge 9 of the end shield 1 is circular, with the exception of a short straight section 10 made at the lower edge of the shield. The end shield extends to the bottom edge of the machine and avoids the floor at the position of the straight section 10.

FIG. 4 b) illustrates a cross-section of an end shield for a centre-flange journal bearing. The end shield 1 has an opening 2 in the middle with a centre-flange journal bearing 30 and the rotor shaft 4 installed into it. The bearing has been moved towards the electrical machine 35 by embedding the bearing attachment surface 3 axially closer to the electrical machine 35. The embedding reduces the bearing span of the electrical machine that is measured from the middle surface 37 of the bearing. At the position of the winding ends, the inner surface of the end shield extends to the surface 32 determined by the winding ends and the air insulation gap. The inner rim 5 of the end shield protrudes towards the electrical machine at the position of a projection cast inside it, the reinforcement ring 31, forming a high cylindrical surface. The inner rim 5 receives and balances the bending load coming from the intermediate rim, the wave zone. The radial height b of the inner rim 5 (without the reinforcement ring 31) is less than the thickness c of the opening 2.

The intermediate rim 6 has a waved reinforcement structure with recesses 7. The radial height f of the intermediate rim 6 is greater than the sum of the radial height b of the inner rim 5 and the radial height e of the outer rim 8, f>b+e.

There is a reinforcement ring 33 on the outer rim 8 on the opposite side of the electrical machine. It is advantageous to use the reinforcement ring 33 to improve the stiffness of the end shield if the frame of the electrical machine 35 is flexible. The axial thickness on the outer rim compensates for the flexibility of the frame of the electrical machine 35. The radial height e of the outer rim 8 is less than the axial thickness d of the outer rim 8. Placement of the reinforcement ring 33 on the end shield 1 on the side opposite to the electrical machine provides several alternatives for choosing the position of the mating surface between the end shield 1 and the frame of the electrical machine 35 and reduces the space requirement of the end shield 1 on the side of the electrical machine 35. The outer rim has bores 34 for bolt attachment onto the frame of the electrical machine.

FIGS. 5 a) and 5 b) illustrate an end shield and its cross-section for a side-flange journal bearing. There is an opening 2 for the rotor shaft in the middle of the end shield 40. The opening 2 is circular and its diameter is $D_1$. Due to the embedding and the shape of the oil sump of the side-flange journal bearing 42, the attachment surface 3 required by it in the half of the end shield 40 below the plane that horizontally intersects the rotor shaft line 12 is substantially larger than in the other half above it. In this case the radial height f of the intermediate rim 6 varies in the circumferential direction. The radial height f of the intermediate rim 6 is smaller in the lower half of the end shield 40 compared to the upper half, and the recesses 41 in the lower half of the end shield 40 are shallower in the radial direction compared to the other recesses 7.

FIG. 6 illustrates the cross-section of an end shield for a rolling bearing. The end shield 50 is symmetrical in relation to the horizontal line against the rotor shaft line 12, and only the upper section is shown. The rolling bearing 51 is installed by axially embedding it against the bearing attachment surface 3.

FIGS. 7 a) and 7 b) illustrate an end shield and its cross-section in which the waved reinforcement structure formed on the intermediate rim has two parts in the radial direction. The end shield is adapted for a side-flange journal bearing. There is a round opening 2 for the rotor shaft in the middle of the end shield 60. There is a reinforcement ring 61 on the intermediate rim 6, dividing the waved reinforcement structure into two parts in the radial direction. The radial height $f_1$ of the reinforcement structure remaining between the reinforcement ring 61 and the inner rim 61 varies in the circumferential direction due to the shape of the attachment surface 3 required by the side-flange journal bearing and its oil sump. There are no recesses 62 at equal intervals in the half of the end shield 60 below the line that horizontally intersects the rotor shaft line 12. Furthermore, there is a local deviation from the waved shape of the reinforcement structure so that there are no recesses 62 between the reinforcement ring 61 and the inner rim 5 at the position of the line that vertically intersects the shaft line 12.

The radial height $f_2$ of the reinforcement structure remaining between the reinforcement ring 61 and the outer rim 8 is constant. The recesses 63 are located at equal intervals on the intermediate rim 6. The valleys in the recesses 62 and 63 are substantially in the radial direction.

When the shaft height of the electrical machine is 63 cm, an advantageously dimensioned end shield according to the invention has the following dimensions: the radial height e of the outer rim 8 is 2 . . . 6 cm; the axial thickness d of the outer rim 8 is 3 . . . 9 cm; the radial height f of the intermediate rim 6 is 22 . . . 37 cm; the radial height b of the inner rim 5 is 2 . . . 5 cm; the thickness c of the opening 2 is 8 . . . 15 cm. The specified dimensions are examples, and a cast end shield according to the invention is also functional in electrical machines with a smaller or greater shaft height.

The invention has been described above with the help of certain embodiments. However, the description should not be considered as limiting the scope of patent protection; the embodiments of the invention may vary within the scope of the following claims.

Part list: 1 end shield; 2 opening; 3 attachment surface; 4 rotor shaft; 5 inner rim; 6 intermediate rim; 7 recess; 8 outer rim; 9 outer edge; 10 straight section; 12 rotor shaft line; 20 waved reinforcement structure; 21*a*, 21*b* ridge; 22 vertical wall; 23*a*, 23*b* valley; 24 neutral plane; 30 centre-flange journal bearing; 31 reinforcement ring; 32 air insulation surface; 33 reinforcement ring; 34 bolt attachment; 35 electrical machine; 36 bolt attachment; 37 axial middle plane of bearing; 40 end shield; 41 recess; 42 side-flange journal bearing; 50 end shield; 51 rolling bearing; 60 end shield; 61 reinforcement ring; 62, 63 recess; $a_1$, $a_2$ width; b height; c, d thickness; $D_1$ diameter; e, f, $f_1$, $f_2$ height; h, $h_1$, $h_2$ profile height; L interval; r radial direction; $r_1$, $r_2$ radial distance; $s_1$, $s_2$, $s_3$, $s_4$, $s_5$, wall thickness.

The invention claimed is:

1. An end shield for an electrical machine, said end shield supporting a bearing that supports a rotor, and said end shield comprising an opening in the middle and, in a radial direction from a centre of the shield, an inner rim limited by the opening, an intermediate rim connected to the inner rim and an outer rim connected to the intermediate rim; wherein there is at least one substantially waved reinforcement structure on the intermediate rim wherein valleys of waves within the reinforcement structure are substantially in the radial direction, wherein a width of the valleys along a circumferential direction at any given radial distance from the center of the shield is substantially equal to a width of ridges of the waves in a circumferential direction at the same radial distance.

2. An end shield according to claim 1, wherein the valleys of the waves are located at even intervals.

3. The end shield according to claim 2, wherein the circumferential interval between the valleys of the waves is 90°>L>15°.

4. An end shield according to claim 1, wherein the wall thickness of the ridge and the valley of the waved reinforcement structure is greater than the thickness of a vertical wall of the waved reinforcement structure connecting the ridge to the valley.

5. An end shield according to claim 1, wherein the wall thickness and/or the profile height of the waved reinforcement structure varies in the radial direction.

6. An end shield according to claim 1, wherein there are two substantially waved reinforcement structures on the intermediate rim in the radial direction.

7. An end shield according to claim 1, wherein the inner rim protrudes towards the electrical machine in the axial direction.

8. An end shield according to claim 1, wherein there is a reinforcement ring on the outer rim.

9. An end shield according to claim 1, wherein the electrical machine is a two-pole stiff-shaft electrical machine.

10. An end shield according to claim 1, wherein the electrical machine is a wind generator.

11. An end shield according to claim 1, wherein the electrical machine is a vertically installed electrical machine in which the shaft line is vertical.

12. An end shield according to claim 1, wherein the valleys of the waves of the substantially waved reinforcement structure extend along an entire radial length of the intermediate rim.

13. An end shield according to claim 1, wherein a radial height of the intermediate rim is greater than the sum of the radial height of the inner rim and the radial height of the outer rim.

14. An end shield according to claim 1, comprising:
a plurality of bores formed in the outer rim for attachment onto a frame of the electrical machine.

15. An end shield according to claim 1, wherein the end shield is cast.

* * * * *